United States Patent [19]

van der Pol et al.

[11] Patent Number: 4,527,107
[45] Date of Patent: Jul. 2, 1985

[54] LIQUID LEVEL MEASURING APPARATUS

[75] Inventors: Ronald van der Pol, Venlo, Netherlands; Dieter Mertens, Duisburg, Fed. Rep. of Germany

[73] Assignee: Rheotron AG, Basel, Switzerland

[21] Appl. No.: 561,892

[22] Filed: Dec. 15, 1983

Related U.S. Application Data

[63] Continuation-in-part of Ser. No. 511,499, Jul. 7, 1983, abandoned.

[30] Foreign Application Priority Data

Sep. 13, 1983 [DE] Fed. Rep. of Germany ....... 3332912

[51] Int. Cl.³ .............................................. G05D 9/00
[52] U.S. Cl. .................................... 318/642; 318/482; 318/632; 318/607; 73/321
[58] Field of Search ............... 318/642, 682, 632, 608, 318/603, 653, 490; 73/321

[56] References Cited

U.S. PATENT DOCUMENTS

| | | | |
|---|---|---|---|
| 2,728,041 | 12/1955 | Boundy et al. | 318/642 X |
| 3,463,981 | 8/1969 | Wires | 318/642 |
| 3,729,667 | 4/1973 | Taylor | 318/642 X |
| 4,274,039 | 6/1981 | Glassey et al. | 318/642 X |
| 4,442,389 | 4/1984 | Sawada et al. | 318/642 |

Primary Examiner—B. Dobeck
Attorney, Agent, or Firm—Cesari and McKenna

[57] ABSTRACT

In liquid measuring apparatus, a cable supporting a sensing plate is attached to a drum that is connected via a magnetic clutch with the drive shaft of a servomotor. The servomotor is supported in a pivot mount which is flexibly rotatively connected to the apparatus housing. In response to liquid level changes, a contactless sensor generates a signal which is compared with a balance of moments reference signal in a comparator to develop a deflection signal which, after conversion into frequency pulses in fast servocontrol circuitry, activate the servomotor in one direction or the other as determined by a polarity switch activated by a directional decoder. Inaccuracies due to parts vibrations are compensated for. Also, measurement disturbances caused by waves at the surface of the liquid are avoided with the aid of slow servocontrol circuitry which, after a delay, activates the servomotor with an adjustable frequency supplied by an oscillator. The changeover between the two control circuits is accomplished by switches which are activated by the deflection signal from the comparator applied to the switches by way of an attenuator and a window discriminator.

17 Claims, 4 Drawing Figures

LIQUID LEVEL MEASURING APPARATUS

RELATED APPLICATION

This application is a continuation-in-part of application Ser. No. 06/511,499, filed July 7, 1983, entitled LIQUID LEVEL MEASURING APPARATUS, now abandoned.

This invention relates to measuring apparatus. It relates more particularly to apparatus for measuring the level of liquid in a tank or other container.

BACKGROUND OF THE INVENTION

It is often desirable to monitor the level of liquid in a tank or other container. For example, such apparatus is used to monitor the level of liquid in a gasoline storage tank so that, when gasoline is drawn from the tank into a tank truck for example, the amount of the gas drawn off and thus its value can be determined with accuracy. Obviously, the more expensive the liquid being sensed, the more important it is to measure accurately the changing liquid level.

There are various known apparatus for accomplishing such liquid level measurement. The type with which we are primarily concerned here employs a sensing plate which floats on the surface of the liquid. The plate is suspended on a cable from a rotary drum connected to the shaft of a servomotor. Either the motor shaft is connected to the drum by way of a flexible connection or the motor itself is mounted to the apparatus housing by way of a rotative flexure. The apparatus is arranged so that the upward force of the liquid on the sensing plate produces a balance of moments at the drum.

When the upward force on the sensing plate increases or decreases due to a raising or lowering of the liquid level, the balance of moments is upset causing angular deflection of the drum and the motor shaft or motor itself relative to the apparatus housing. The amount and direction of such deflection is detected by a sensing device which generates a signal whose magnitude and polarity reflect such deflection. That signal is used in a closed servoloop to drive the servomotor in one direction or the other to raise or lower the sensing plate as required to restore the balance of moments on the drum. Indicating devices driven by the servomotor provide a visual indication of the position of the sensing plate and thus the level of the contained liquid at any given time.

It is also known from DE-OS No. 28 53 360 that in such liquid level measuring apparatus, the drum may be flexibly coupled through a spring to a coaxially supported pivot mounting in the apparatus housing, with the pivot mounting, in turn, being frictionally connected through a gear unit to the servomotor drive shaft which also drives the indicating device. The torsional moment exerted on the drum when the sensing plate rests on the liquid is arranged to be just balanced by the spring tension. When the level of the liquid changes, the moment contributed by the sensing plate is increased or decreased and the spring rotates the drum relative to the pivot mount accordingly. That change in torsional moment is ascertained by means of a contactless signalling device which activates the servomotor by means of a control unit at a speed and direction that rotates the drum until the balance of moments is restored.

As contactless signaling devices in such apparatus, there are associated with the two relatively rotating members two slotted or apertured plates which generate in conjunction with an electrostatic or magnetic field or with light sources and suitable light sensors, voltage signals corresponding to the angle of rotation of the drum. These voltage signals are fed through a motor speed control unit as well as through a comparator stage that ascertains the direction of rotation, to a control device that activates the servomotor drive.

There is further known liquid level measuring apparatus having an explosion-proof construction in which the drive unit arranged in an encapsulated housing chamber is connected through a magnetic coupling with the cable drum. In this type apparatus, the servomotor is mounted to a pivot mount that is coaxially supported to the motor shaft. The pivot mount is flexibly connected in both directions of rotation to the instrument housing. Also, the motor shaft is connected to a roller counter via a gear drive that drives the counter with a suitable reduction ratio. A potentiometer is positioned at the pivot mount and engaged by a pin attached to the housing in order to generate a control signal proportional to the deflection of the pivot mount relative to the housing, which control signal is used to control the servomotor.

The measuring accuracy of such prior apparatus is, however, impaired due to various influences. Waves are formed at the surface of the liquid as the liquid flows into the tank or because of agitators or the like resulting in inaccurate and mostly unreproducible liquid level measurements. Besides the disturbances caused by wave motion, there also may occur oscillations or vibrations of the mechanical parts of the apparatus such as the servomotor, rotative flexures, gears, etc. These may give rise to moment-upsetting forces and introduce disturbance variables into the control loop and thus upset or impair the accuracy of the control signal for the servomotor. Other measuring inaccuracies are caused by the fact that the torsional moment on the drum contributed by the sensing plate changes as the liquid level changes because of the varying weight of the unrolled cable segment supporting the plate. In addition, the absolute encoders used in such prior apparatus to generate a remote indication of the liquid level are quite expensive, while contacting-type absolute encoders have poor wear resistance and are prone to failure. Furthermore, it is difficult to provide a calibration or zero setting for the remote display encoders in such prior apparatus at start-up or after a power failure. In general, the prior liquid level measuring instruments of this general type are disadvantaged in that they do not indicate rapid changes in liquid level quickly enough and yet with the requisite accuracy to maintain close control over the liquid inventory.

SUMMARY OF THE INVENTION

Accordingly, it is an object of the present invention to provide an improved liquid level measuring apparatus.

Another object of the invention is to provide liquid level measuring apparatus which responds promptly and accurately to changes in the level of the liquid being measured.

A further object of the invention is to provide such apparatus whose level measurement is not affected by wave motion and other disturbances at the surface of the liquid.

Still another object of the invention is to provide liquid level measuring apparatus whose measurement indication is unaffected by changes in the unrolled length of the sensing plate cable as the liquid level rises and falls in its container.

A further object is to provide such level measuring apparatus whose level indication is unaffected by vibrations or movements of the various apparatus parts.

Another object of the invention is to provide apparatus of this general type which produces a signal suitable for controlling a remote liquid level indicator accurately and economically.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

The present apparatus is arranged to be mounted at the top of or adjacent to the tank containing the liquid to be measured so that its sensing plate can rest at the surface of that liquid.

The sensing plate drum is mounted in an explosive-proof chamber of the apparatus housing. The drum is magnetically coupled to the shaft of a servomotor cantilevered on its shaft in a second chamber of the housing. A pivot mount supported by the motor is rotatively coupled to the housing by way of flexures which permit the pivot mount and motor to deflect angularly relative to the housing in response to changes in the torsional force applied by the sensing plate to the drum as the liquid level rises and falls in the tank.

The pivot mount is spring biased to a reference angle so that a balance of moments on the drum is established when the sensing plate rests on the liquid surface. Then, when the liquid level rises or falls, there is a change in the torsional force applied to the drum by the plate which causes a deflection of the pivot mount from its reference angle. That deflection is detected by a contactless sensor acting between the pivot mount and the housing which generates an output signal reflecting the direction and amount of the deflection. That signal is applied to a comparator which compares it to a reference value which corresponds to the balance of moments on the drum. The signal from the comparator which represents the deflection variable is then used to generate a signal whose frequency is proportional to the deflection for driving the servomotor in a closed servoloop at a speed proportional to the magnitude of the deflection.

The deflection signal is also applied to a decoder which determines the deflection direction so that the drive signal applied to the servomotor has the proper polarity to cause the motor to rotate the drum so that the sensing plate follows the rising or falling liquid level until the plate again rests on the surface of the liquid and the balance of moments on the drum is reestablished.

The utilization of a comparator in the apparatus to develop the drive signals for the servomotor is particularly desirable since it facilitates the introduction into the servoloop of compensating variables and control signals. One such variable that is compensated for by the present apparatus is the change in the torsional force applied to the drum due to the varying weight of the unrolled segment of cable supporting the sensing plate as the liquid level rises and falls. To provide such compensation, the apparatus servomotor drives through appropriate gearing a potentiometer or other such signaling means whose output reflects motor shaft rotation and therefore changes in the length of the unrolled cable segment supporting the sensing plate. That output is used to provide a compensating voltage to the comparator which essentially shifts the set point of the comparator as the length of the unrolled cable segment decreases and increases with the rise and fall of the liquid level.

The present apparatus operates in a fast control mode when there is an actual change in the level of the liquid being measured. In this mode, the servomotor is controlled by the frequency pulses corresponding to the deflection of the pivot mount due to the moment unbalance at the drum supporting the sensing plate. As the moments on the drum are coming within a condition of balance so that the deflection signal is coming within a selected window indicating that the sensing plate is near its equilibrium position at the liquid surface, the apparatus, after a brief delay, is switched over to a slow control mode of operation wherein the servomotor is driven by relatively low frequency signals supplied by an oscillator which cause the servomotor to rotate the drum quite slowly so that the sensing plate is brought gently to its equilibrium position at the surface of the liquid as the balance of moments on the drum is achieved.

In a preferred embodiment of the apparatus, in the fast control mode, the deflection signal is also applied to a high-pass filter. Components of that signal above a selected cut-off frequency which arise due to mechanical oscillations of the various mechanical parts of the apparatus are passed by the filter and are applied to proportionally reduce the drive signal to the servomotor. As a result, those mechanical oscillations do not adversely affect the achieving of a balance of moments condition or the accuracy of the liquid level indication provided by the apparatus.

In the fast control mode, the polarity of the drive signal applied to the servomotor and thus the rotary direction of the motor is controlled directly by the deflection signal from the comparator. However, when the apparatus switches over to the slow control mode, the motor direction is controlled by a signal derived from the deflection signal that is attenuated or damped so that small deviations of the balance of moments caused by transient wave motions and disturbances at the surface of the liquid do not result in a constant to and fro switching of the servomotor between its forward and reverse directions.

If there should be another actual change in the level of the liquid in the tank, the resultant moment unbalance on the drum initiates a deflection signal from the comparator that switches the apparatus to its fast control mode without any delay so that drive signals are applied to the motor causing it to rotate the drum so that the sensing plate immediately follows the rising or falling movement of the liquid. Resultantly, there is minimal delay in the new level indication provided by the apparatus.

The present apparatus, like other comparable liquid level measuring instruments of this general type, incorporates a display right in the apparatus housing which is driven by the servomotor through suitable gearing to provide a direct readout of liquid level. So too, it develops signals to control a remote level indicator. However, it derives the signals for controlling the remote display accurately in a particularly simple, economical and elegant manner. Remote display is realized by an incremental encoder which is driven by the servomotor. The output signals from the encoder which reflect the vertical movements of the sensing plate in response to changes in the level of the liquid in the tank are applied to an up/down counter or other digital display at the remote location.

Such an incremental system requires a plate position reference to load the initial count in the counter at startup and after a power failure to calibrate the counter. In the present apparatus, such reference is provided by a sensing plate stop in the apparatus housing. At start up or after a power failure, a RESET signal is applied to the comparator that changes its set point so that the comparator produces a deflection signal that causes the servomotor to raise the sensing plate against the stop. The force with which the sensing plate is drawn against the stop is made as close as possible to the force applied by the sensing plate to the drum when the plate is in its equilibrium position at the liquid surface. If that resetting lifting force proves insufficient to separate the plate from the liquid due to surface adhesion, the apparatus applies a larger lifting force momentarily to overcome that effect as will be described in detail later.

After the balance of moments on the drum is established, the apparatus issues a signal to the remote counter that loads the counter with a selected count which may correspond, for example, to the usable height of the tank. Upon cessation of the RESET signal to the comparator, the plate is lowered back to the liquid surface and the remote counter, having been reset or calibrated, now displays accurately the actual height of the liquid in the tank.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
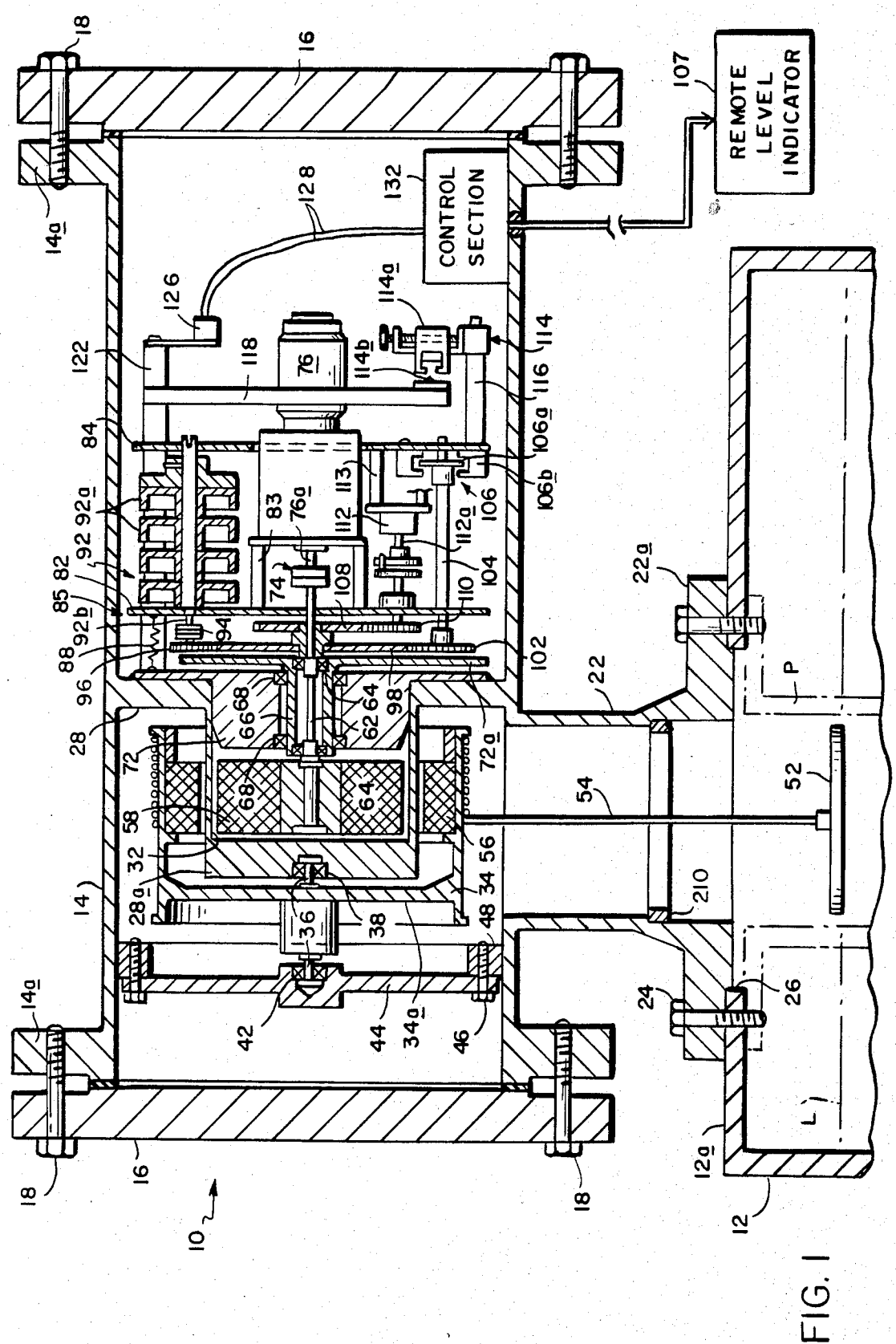
FIG. 1 is a longitudinal sectional view with parts in elevation of liquid level measuring apparatus made in accordance with this invention.

Referring to FIG. 1 of the drawings, the measuring apparatus indicated generally at 10 is arranged to measure the level of a liquid L in a tank or other container 12. The working elements of the apparatus are contained in a rigid generally cylindrical housing 14 whose opposite ends are flanged at 14a to accommodate discoid access covers 16 removably connected to flanges 14a by bolts 18. Housing 14 is formed with a depending tubular neck 22 terminated by a flange 22a that is removably connected by bolts 24 to the top wall 12a of tank 12, there being an opening 26 in the tank wall 12a directly under the housing neck 22.

The space inside housing 14 is divided into two separate compartments by a cup-like bearing wall 28 originating just to the right of neck 22. That bearing wall forms a generally cylindrical pocket 32 overlying neck 22 with the end of the pocket being closed by a relatively thick discoid wall section 28a. Thus, the components inside the apparatus housing 14 to the left of wall 28 are exposed to the atmosphere inside tank 12. However, the apparatus components to the right of wall 28 are completely isolated from the tank environment. By the same token, the operation of those components cannot affect the tank contents.

A cylindrical drum 34 encircles bearing wall 28. The drum end wall 34a is provided with a pair of oppositely extending axles 36. One such axle rotates in a bearing 38 recessed into the wall section 28a. The other axle 36 rotates in a bearing 42 recessed into a discoid partition wall 44 which is removably retained by bolts 46 to an interior housing wall flange 48 located just to the left of the housing neck 22. A level sensing plate 52 is suspended from the drum 34 by a rope or cable 54 extending down through neck 22 into tank 12. In the illustrated arrangement, the plate moves up and down in an open pipe shown in dotted lines at P which surrounds opening 26 and tends to isolate the plate from surface agitation of the liquid L. Normally the plate assumes an equilibrium position at the surface of the liquid L so that the it tends to follow the liquid in the tank 12.

Contained in drum 34 is a magnet ring 56 which cooperates with a magnetic rotor 58 inside pocket 32 to form a contactless magnetic coupling. Magnet 58 is mounted to a shaft 62 which extends out of pocket 32 along the axis of housing 14. Shaft 62 is rotatively mounted by way of a pair of bearings 64 to a flanged bushing 66. That bushing is, in turn, rotatively mounted via a pair of bearing elements 68 to a flanged annular block 72 which plugs the mouth of pocket 32. The block flange 72a is welded or otherwise permanently secured to housing wall 28. The end of shaft 62 beyond wall 28 is coupled by way of a magnetic clutch 74 to the shaft 76a of a servomotor 76. Thus the motor is cantilevered on its shaft 62 from the block 72 secured by way of the bearing wall 28 to the housing 14.

The servomotor 76 is part of the apparatus drive section all of which is contained in housing 14 to the right of the wall 28 and is thus isolated from the interior of tank 12 which could contain an explosive atmosphere. A plate 82 is connected by standoffs 83 to motor 76 and an annular plate 84 surrounds the opposite end of the motor. The two plates 82 and 84, along with motor 76, form a pivot mount shown generally at 85 which is cantilevered on shaft 62 and rotatable relative to housing 14 by way of the bushing 66. Also, of course, the motor shaft and shaft 62 are rotatable on bearings 64 relative to that bushing. The pivot mount 85 is urged toward a reference angle relative to housing 14 by one or more springs 88 acting between plate 82 and the flanged block 72 mounted to the housing wall 28.

Suspended between plates 82 and 84 is a conventional roller counter shown generally at 92. Counter 92 comprises a set of wheels 92a which carry numerals which are visible through a window (not shown) in the wall of housing 14. These wheels provide a digital readout of the liquid level in tank 12 as measured by the apparatus 10. The counter shaft 92b is connected by way of a slip clutch 94 to a spur gear 96. Gear 96 meshes with a larger gear 98 mounted to rotate with shaft 62 driven by motor 76. When the liquid level in tank 12 changes, the motor 76 is actuated to rotate drum 34 to raise or lower plate 52 to follow the liquid. Thus the rotations of shaft 62 reflect liquid level changes. Accordingly, counter 92 can be set or calibrated via clutch 94 so that its count corresponds to the actual liquid level in the tank at any given time.

The gear 98 also meshes with a second spur gear 102 which drives a shaft 104 rotatively mounted to plates 82 and 84. Shaft 104 drives a contactless incremental encoder shown generally at 106 which delivers an electrical signal also indicative of the rotations of shaft 62. The encoder can be of any conventional type. The one specifically illustrated, comprises a plate 106a containing two offset rows of radial slots. The plate is rotated opposite a stator 106b supporting a pair of aligned light sources and photodiodes. The rotating plate interrupts the light beam transmissions to the photodiodes, thereby generating a pair of AC signals in phase quadrature. The signals therefore reflect the magnitude and direction of rotation of shaft 104 and therefore shaft 62 to which it is coupled. These signals are used to control a remote display of liquid level such as an up/down counter 107.

Still referring to FIG. 1, another gear 108 is mounted to rotate with shaft 62. Gear 108 meshes with a gear 110 which rotates the armature 112a of a potentiometer 112 mounted to plate 84. The potentiometer is of conventional construction, e.g. a helix potentiometer. The resistance value of the potentiometer thus reflects the rotation of shaft 62 and that value is used as will be described later to compensate for the change in moment applied to drum 34 due to the unrolled segment of cable 54 whose length changes as the liquid level varies.

Also present in housing 14 is a conventional contactless encoder such as a Hall sensor indicated generally at 114 which measures the angular deflection of the pivot mount 85 from its reference position relative to the housing. Sensor 114 comprises a magnet 114a which is connected by way of a bracket 116 to plate 84 and a Hall probe 114b connected by a bracket 118 to a standoff 122 mounted to the housing wall 28. Also secured to standoff 122 is a terminal strip 126 at which the various aforementioned electromechanical components of the apparatus are connected by a harness or cable 128 to the apparatus's control section 132 illustrated in detail in FIG. 2.

During operation of the apparatus, when the level of the liquid L in tank 12 changes, the liquid's supporting effect on the sensing plate 52 changes accordingly to vary the torsional moment applied by the plate to drum 34. That moment change is magnetically coupled by way of rotor 58 and bushing 66 to the pivot mount 85 causing that mount to rotate away from its reference angle established by springs 88. That angular deflection is therefore indicative of the relative displacement of the plate 52 and liquid L and is measured by the noncontacting Hall sensor 114. Sensor 114 develops a corresponding electrical signal that is applied via control section 132 to actuate servomotor 76. The motor thereupon rotates rotor 58 and thereby the drum 34 thereby to raise or lower the plate 52 to follow the surface of the liquid and to maintain the plate equally deep in the liquid by maintaining a constant force on the plate. Thus the torque on the drum caused by the weight of the plate 52 and its supporting cable 54 is precisely regulated to ensure that the plate rests at a fixed depth at the liquid surface. When the lift force of the plate varies due to a changing level of the liquid, the torque applied to the drum 34 is also varied slightly. The servomotor 76 under the control of section 132 thereupon follows up to restore the balance of moments acting on the drum 34.

As the shaft 76a of the servomotor rotates in one direction or the other to raise or lower plate 52 until the balance of movements is restored as aforesaid, it increments or decrements the counter 92 so that the counter accurately displays the current level of the liquid in tank 12. The servomotor also drives the incremental encoder 106 which develops an electrical signal that is delivered via control section 132 to counter 107 so that the liquid level is also displayed at a remote location.

Figure 2:
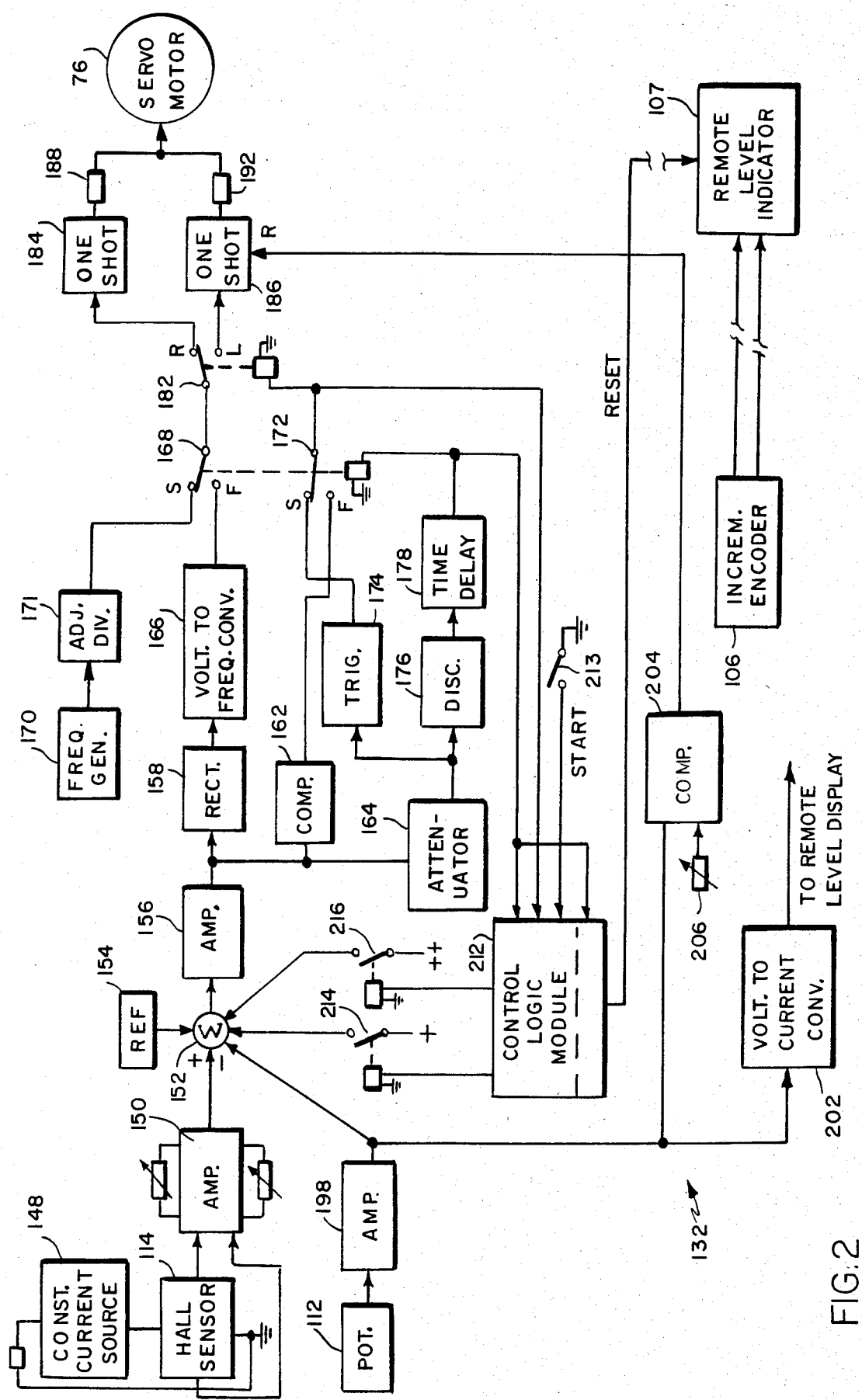
FIG. 2 is a block diagram of the control section of the FIG. 1 apparatus.

Refer now to FIG. 2 which shows the control section 132 in greater detail. The Hall sensor 114 is powered by a constant current source 148 and its output is applied by way of an amplifier 150 having gain and offset adjustment capabilities to comparator means in the form of a summing junction 152. There, that signal is compared with a reference voltage from a reference voltage generator 154 that provides a set point corresponding to the balance of moments on drum 34. That is, the reference voltage corresponds to the upward force acting on the plate 52 when in equilibrium at the surface of the liquid. That force is made as small as possible to minimize liquid density influences on the level measurement indicated by apparatus 10.

The difference signal from the summing junction 152 is applied to an amplifier 156. The amplified signal thus constitutes a deflection or error signal and it is coupled to a double phase rectifier 158, a comparator 162 and an adjustable attenuator 164. The signal from the rectifier is altered by a non-linear voltage-to-frequency converter 166 and applied to the terminal F of a mode control switch 168. Switch 168 also receives at its terminal S a signal from a frequency generator 170 which is applied by way of an adjustable divider 171.

The output of comparator 162 is fed directly to the terminal F of a second mode control switch 172 which switches coincidentally with switch 168. The output of the attenuator 164 drives a trigger circuit 174 whose output is connected to the terminal S of switch 172. The attenuator signal is also applied by way of a window discriminator 176 to a directionally dependent time delay circuit 178. The discriminator develops an output signal to maintain mode control switches 168 and 172 in their S positions only when the amplitude of the attenuated deflection signal from amplifier 156 comes within a selected window corresponding to a selected minimum deviation from the balance of moments on drum 34, e.g. +10 gm.

The signal at the F or S position of switch 168 is fed to a direction switch 182. That switch has a pair of terminals R and L connected to a pair of monostable multivibrators 184 and 186. The multivibrator outputs are applied by way of a pair of current drivers 188 and 192 to drive servomotor 76 in the forward or reverse direction. Thus the motor is driven in a clockwise or counterclockwise direction to raise or lower sensing plate 52 (FIG. 1) depending upon the position of the direction switch 182. That switch is controlled by the signal appearing at the F or S position of mode control switch 172.

The control section 132 thus comprises a closed loop servosystem with two servoloops namely a fast control loop wherein the signal for driving the motor 76 derives from sensor 114 by way of converter 166 and a slow control loop wherein the drive signal for the motor originates at frequency generator 170. The selection of the fast or slow control loop depends upon the position of the switch 168 which, as noted previously, is controlled by the output of the time delay circuit 178.

As long as the level of liquid in tank 12 remains stationary, there is a balance of moments on drum 34. Therefore, there is minimal or no deflection of pivot mount 78 from its reference position so that the attenuated deflection signal applied to discriminator 176 is small. As long as that signal lies within the discriminator window, the discriminator provides an output that maintains the mode control switches in the S or slow servocontrol positions as shown in FIG. 2. Resultantly, the speed of motor 76 is controlled by a relatively low frequency signal from divider 171.

Also, the direction switch 182 is controlled by pulses from trigger 174 which responds to the damped deflection signal from attenuator 164. A small deflection signal of one polarity indicating a slight rise in liquid level causes trigger circuit 174 to assume its R position so that the divider 171 pulses are applied to motor 76 via multivibrator 184. Resultantly, the motor is rotated slowly clockwise to raise plate 52 slowly to restore the moment balance on drum 34. A deflection signal of the opposite polarity reflecting a drop in liquid level moves switch 182 to its L position so that the divider 171 pulses are applied to motor 76 via multivibrator 186 so that the motor lowers the plate accordingly. The attenuator 164 smooths the deflection signal from amplifier 156 which could be overlaid with high frequency components or distortions due to wave disturbances at the surface of liquid L which momentarily effect the balance of moments on drum 34. This prevents motor 76 from being switched back and forth by switch 182 between its forward and reverse directions in response to such perturbations in liquid level.

If there should be an actual rise or fall of the level of the liquid in tank 12, the damped signal applied to discriminator 176 falls outside the discriminator window. This causes a change in the discriminator's output which switches the mode control switches 168 and 172 to the F positions for fast control mode operation. The delay circuit 178 is directionally dependent and does not effect the control signal to the switches so that there is no time lag in the switchover to the fast control mode. In this mode, the direction switch 182 is controlled directly by the polarity of the deflection signals from amplifier 156 applied via comparator 162. Resultantly, the motor 76 is driven by the variable frequency signal from converter 166 at a speed that is proportional to the moment unbalance on drum 34 and in a direction that raises or lowers plate 52 to follow the liquid surface in the tank.

As soon as the liquid level stabilizes and the damped deflection signal from attenuator 164 again falls within the range of the discriminator, indiating reestablishment of a near balance of moments condition, that circuit issues a signal which is delayed by delay circuit 178 for a few (e.g. 3 to 10) seconds before being applied to switch the mode control switches 168 and 172 to their S positions. This assures that plate 52 has actually settled on the surface of the liquid before the apparatus switches to its slow control mode of operation to effect the actual balance of moments on drum 34, as described above. The attenuator 164 assures that the control section 132 will not switch back and forth between its fast and slow control modes in response to transient wave motions of the liquid. The slow servocontrol mode is thus enabled with high measuring accuracy and resolution despite disturbances at the surface of the liquid in the tank.

Referring to FIGS. 1 and 2, as the sensing plate 52 follows the rising and falling movements of the liquid L, the length of the unwound segment of cable 54 varies accordingly. The changing weight of that unwound segment is reflected as a changing torque on the drum 34, thus affecting the balance of moments on the drum. A preferred embodiment of the present apparatus compensates for the weight of that unwound length of cable. More particulaly, the potentiometer 112 driven by the servomotor via gears 108 and 110 has an impedance which varies directly with the length of the unwound cable segment supporting plate 52. That impedance is applied to a high impedance voltage following amplifier 198 and the amplifier output is fed to the summing junction 152 to change its set point as the length of the unrolled cable segment varies to compensate for that variation. Also, since the amplifier output reflects accurately changes of liquid level in the tank, it can be applied by way of a voltage-to-current converter 202 to control a remote analog indicator for displaying liquid level. That signal thus supplements the output of the incremental encoder 106 which is also used to generate a liquid level display at a remote location.

The signal from amplifier 198 is also applied to a comparator 204 whose output is used to determine the lowest point to be reached by the sensing plate as set by a reference potentiometer 206 at the comparator. The comparator signal is applied to the R input of multivibrator 186 so that when plate 52 reaches the selected lowest point in tank 12, the multivibrator 186 is reset so that the driving pulses to motor 76 that lower the plate are terminated. At that point, the apparatus 10 will only respond to a rising liquid level as the tank 12 is filled. That selected lowest point may vary depending upon the particular application. For example, a given tank may have a stirrer projecting up from the tank bottom. If desired, a similar arrangement may be provided to reset multivibrator 184 to limit the upward excursion of plate 52.

As noted previously, the incremental encoder 106 driven by the servomotor 76 by way of gears 98 and 102 generates a signal that reflects changes of liquid level and it is used to control the remote level indicator 107. Such an incremental arrangement requires a plate 52 position reference to load the initial count into the remote counter 107 at the start of operation so that the counter accurately displays the starting level of the liquid in tank 12. Also, when using such incremental counters, in the event of a power failure, the value then in the counter may be canceled so that, when power is restored and the system is restarted, that value must be reset into the counter. The present apparatus accomplishes this objective in a particularly simple and economical way.

More particularly, as shown in FIG. 1, a sensing plate stop 210 is incorporated into the apparatus housing 14 near the lower end of neck 22. In the illustrated apparatus, the stop takes the form of a ring or annulus whose inner diameter is smaller than the diameter of the sensing plate 52. The stop member thus limits the upward travel of the plate 52. Other equivalent devices for limiting upward motion of the plate or its cable 54 can easily be envisioned. Also, the control section 132 of the apparatus includes a control logic module 212 which receives the signal at mode control switch 172 as well as the output of the time delay circuit 178. Module 212 starts its routine when a switch 213 is closed. The module 212 controls a switch 214 which, when closed, adds a fixed voltage to the summing junction 152 that increases the set point of the junction. This causes the sensing plate 52 to be raised with a given force against stop 210 which thus functions as a position reference point for the plate. This force is selected such that the torsional moment exerted thereby on the drum 34 is approximately the same as the torsional moment exerted when the sensing plate 52 is in equilibrium at the surface of the liquid in tank 12. Desirably, the force should be as small as possible so that the balance of moments is more or less independent of the density of the liquid. Since the pulling force of the plate against the stop member 210 is always the same, the relative angular deflection of the magnetic coupling member 56, 58 also remains the same, thereby assuring an accurate resetting of the remote counter 107 during each start up of the apparatus.

After the plate 52 is pulled against the stop 210 with the preset force, and control section 132 has switched to its slow control loop mode of operation as described above indicating a balance of moments on drum 34, module 212 issues a RESET pulse to the remote level display 107 which loads a preset value into the indicator so that the indicator is calibrated to display accurately the liquid level in tank 12. Also, as soon as the balance of moments is achieved, the control signal from module 212 to switch 214 ceases. Resultantly, that switch opens and the system reverts to a normal measuring mode of operation with the set point of the servoloop determined primarily by reference 154. That is, with control section 132 in its fast control mode, sensing plate 52 is lowered quickly to the surface of liquid L. Whereupon the section switches to its slow control mode to gently lower the plate to its equilibrium position at the liquid surface which achieves a balance of moments on drum 34. The signal produced by encoder 106 as the plate is lowered decrements the counter 107 so that when the plate does rest at the surface of the liquid, the counter displays the actual liquid level.

Due to the effect of atmospheric pressure, there may be adhesion of the sensing plate 52 to the liquid making it more difficult to pull the plate away from the liquid. To account for this phenomenon, the logic module 212 also controls a second switch 216 which applies an additional voltage from another preset source to the summing junction 152. When resetting the apparatus initially or after a power failure, the module 212 is programmed to close both switches 214 and 216 to shift the summing function set point so that the plate is pulled up initially with a relatively large force. Then after a short delay, say five seconds, module 212 opens switch 216 so that the subsequent upward motion of the plate against stop 210 is due solely to the lower supplemental voltage contributed to the summing junction via switch 214 corresponding to the upward force of the liquid on the plate.

The logic module 212 can be designed so that by closing switch 213 for a short period of time, say less than five seconds, the sensing plate 52 will be lifted from the surface of the liquid a short distance, say 10 cm for a function test and then lowered automatically onto the liquid surface. On the other hand, if the switch 213 should be closed for a longer period of time, say ten seconds, the plate 52 will be lifted automatically against stop 210, the remote counter 107 will be reset and then the plate will be lowered automatically to the liquid surface. Finally, if the switch should be closed continuously, the plate 52 will be maintained in its elevated position against stop 210.

In some instances, various mechanical components of the apparatus such as the motor, flexures, gears, etc. may vibrate or oscillate due to the apparatus operation, building vibrations and the like. When the system is operating in its fast control mode, these disturbances can upset the balance of moments on the drum 34 and give rise to spurious components in the drive signal applied to the motor 76, thereby introducing errors into the level indication provided by the apparatus. To minimize these errors or avoid them entirely, the control section 132 can be modified to compensate for those vibratory signal components in the deflection signal which is ultimately used to control motor 76. This is accomplished by detecting the higher frequency deflection signal components caused by such vibrating parts and applying them as a control signal to a proportional action controller in the control loop between summing junction 152 and the voltage-to-frequency converter 166 to proportionally reduce the drive signal to the motor 76.

Figure 3A:
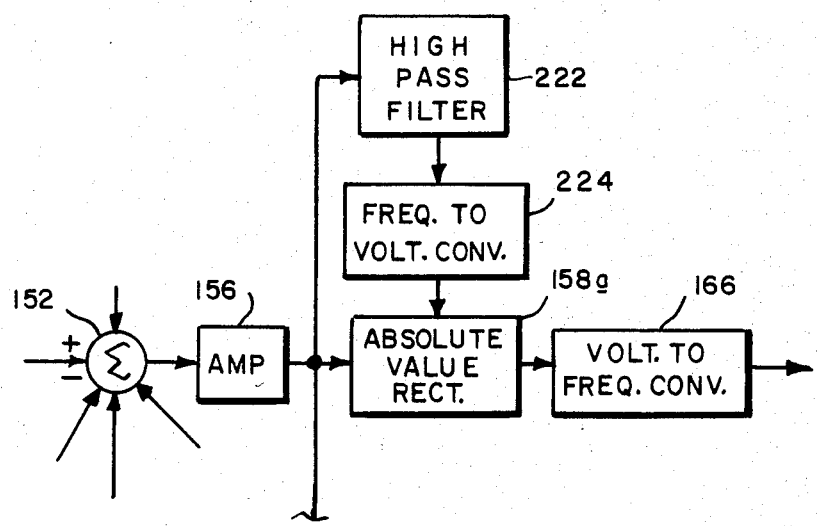
FIGS. 3A and 3B are similar views of two different control section embodiments which also compensate for mechanical oscillations of various parts of the FIG. 1 apparatus.

FIG. 3A illustrates an arrangement wherein such proportional control is achieved by connecting a rectifier between amplifier 156 and converter 166 whose gain can be controlled, i.e. an adjustable absolute value rectifier 158a. The deflection signal from amplifier 156 is applied to a high-pass filter 222 which is designed to pass those signal components or frequencies which arise primarily due to mechanical vibrations of the apparatus parts described above. Preferably, the cut-off frequency of filter 222 should lie below the resonance frequency of the mechanically controlled system. In a typical apparatus, cut-off frequencies between 1 and 25 Hz have proven effective.

The signal from filter 222 is coupled to a frequency-to-voltage converter 224 and the voltage output from the converter is applied as a control signal to rectifier 158a. As the frequency of the signal passed by filter 222 increases, the voltage output from rectifier 158a that is applied to converter 166 to drive motor 76 is proportionally reduced to compensate for the vibration-induced components in the deflection signal. Resultantly, those spurious signals do not adversely affect the measuring accuracy of the apparatus.

Figure 3B:
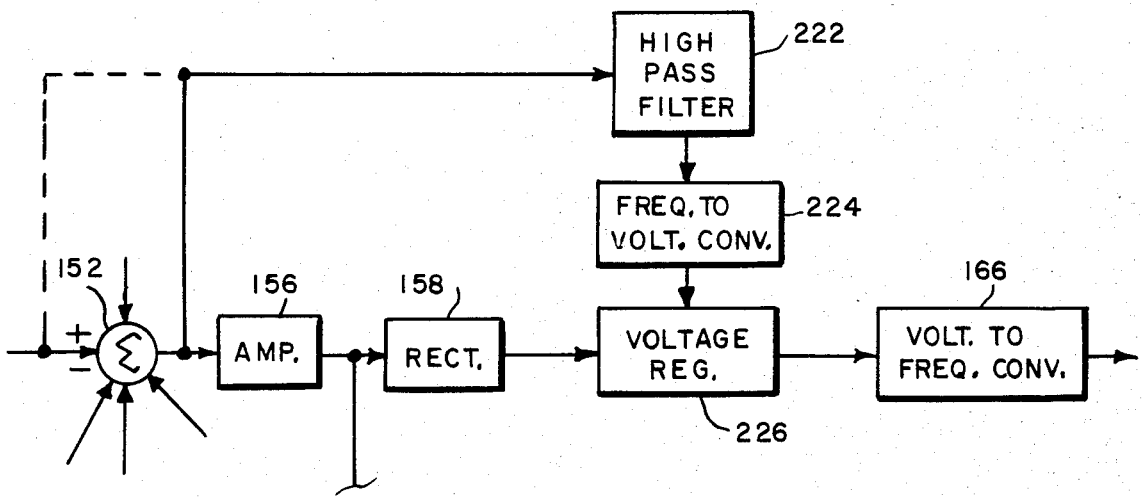

FIG. 3B shows a slightly different arrangement for compensating for such parts vibrations. In that circuit, a proportional controller in the form of a voltage regulator 226 is connected in the control loop between rectifier 158 and converter 166. The high-pass filter 222 receives the non-amplified deflection signal from summing junction 152. The signal frequency from the filter is converted to a voltage and used to control the regulator to reduce the drive signal applied to motor 76 in proportion to the signal frequency passed by the filter. If desired, the input to filter 222 can come directly from the sensor 114 as shown in dotted lines in FIG. 3B. Also, the control signal for the rectifier 158a or regulator 226 may be applied as an analog signal, a digital signal or other discrete signal.

It will be seen from the foregoing then that the present apparatus 10 provides for the continuous accurate monitoring of the level of a liquid in a container. The apparatus responds quite quickly to rapid changes in liquid level so that it can display accurately that level both at a local and at a remote location. The apparatus gives an accurate measurement at all liquid levels and despite disturbances at the surface of the liquid and mechanical oscillations of the apparatus parts. Furthermore, it provides for the resetting or recalibrating of any remote display to which it is connected both at start up and after a power failure. Therefore, the apparatus should find wide application particularly in the petroleum industry where large inventories of contained gasoline and other expensive liquids must be monitored accurately in order to minimize slippage.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. In liquid measuring apparatus of the type including a sensing plate suspended on a cable attached to a rotary drum connected to the shaft of a servomotor, with the shaft being rotatively connected through a spring member to the drum or the motor itself being flexibly and rotatively coupled to the apparatus housing, a liquid level indicator coupled to the motor shaft, a sensor operative between the rotatively connected members which generates an output signal in response to a relative rotation of said members caused by changes in liquid level, and control circuitry responsive to the sensor signal for controlling the speed and direction of the motor to raise or lower the plate and thereby tend to maintain a balance of moments on the drum characterized in that the control circuitry includes
   A. comparing means which receive the output signal from the sensor;
   B. means for applying a reference signal to the comparing means which corresponds to the nominal balance of moments on the drum so that the comparing means produce a deflection signal reflecting the magnitude and direction of the moment imbalance;
   C. means for converting the deflection signal to an alternating signal whose frequency is proportional to the magnitude of the deflection signal;
   D. means for applying the alternating signal to the motor to rotate the motor selectively in the forward or reverse direction; and
   E. direction selection means responsive to the deflection signal for causing the applying means to select the direction of motor rotation which moves the sensing plate so that the plate tends to assume an equilibrium position at the surface of the liquid.

2. The apparatus defined in claim 1 wherein the converting means comprise an amplifier, a rectifier and a voltage-to-frequency converter connected in series between the comparing means and the applying means.

3. The apparatus defined in claim 1 wherein the direction selection means comprise
   A. a direction switch;
   B. a pair of motor drive means connected between said switch and said motor; and
   C. direction decoding means responsive to the deflection signal for controlling the position of the direction switch.

4. The apparatus defined in claim 3 and further including
   A. means for generating a fixed frequency signal;
   B. switch means for connecting the direction switch selectively to receive the deflection signal or the fixed frequency signal; and
   C. means responsive to the deflection signal for controlling the switch means so that the switch means apply to the direction switch either the deflection signal or the fixed frequency signal depending upon the magnitude of the deflection signal.

5. The apparatus defined in claim 4 wherein the controlling means include delay means for delaying aplication of the fixed frequency signals to the direction switch for a selected brief period of time.

6. The apparatus defined in claim 1
   A. and further including means for generating a fixed frequency signal;
   B. wherein the applying means include switch means for coupling to the motor either the deflection signal or the fixed frequency signal; and
   C. means responsive to the deflection signal for controlling the position of the switch means depending upon the magnitude of the deflection signal.

7. The apparatus defined in claim 6 wherein the controlling means include means for preventing oscillatory selection by the switch means of the deflection and fixed frequency signals.

8. The apparatus defined in claim 6 wherein the controlling means comprise
   A. attenuating means connected to receive the deflection signal; and
   B. discriminator means connected between the attenuator means and the switch means so that the signal from the discriminator means causes the switch means to select the fixed frequency signal only when the magnitude of the deflection signal lies within selected values.

9. The apparatus defined in claim 8 wherein the applying means include a direction switch for coupling signals to the motor to rotate the motor in either its forward or reverse direction, the position of the direction switch being controlled by the deflection signal or the signal from the attenuator depending upon the state of the switch means.

10. The apparatus defined in claim 1 and further including
    A. means for producing an output signal proportional to the length of the unwound segment of cable supporting the sensing plate, and
    B. means for coupling said signal to the comparing means to compensate for the torque moment applied to the drum due to the varying weight of said segment.

11. The apparatus defined in claim 10 wherein the signal-producing means comprise
    A. a detector whose output value reflects rotations of the servomotor shaft; and
    B. means responsive to said value for providing a signal whose magnitude reflects said detector output value.

12. The apparatus defined in claim 1 and further including
    A. detecting means for producing an output value reflecting rotations of the motor shaft;
    B. stop means for establishing a reference position for said plate;
    C. means for moving said plate to said reference position under a small force more or less equal to the unrolling force exerted on the drum when the plate is in equilibrium at the liquid surface until there is a substantial balance of moments on the drum; and
    D. means responsive to the condition of moment balance for issuing a control signal for coupling to a remote level indicator to reset or calibrate that indicator.

13. The apparatus defined in claim 12 wherein the moving means comprise
   A. means for producing a reset signal corresponding to said force; and
   B. means for applying the reset signal to the comparing means to supplement the reference signal applied thereto and thereby to adjust the set point of the comparing means.

14. The apparatus defined in claim 13 and further including means for changing the magnitude of the reset signal applied to the comparing means to vary the force moving the plate toward its reference position.

15. The apparatus defined in claim 1 and further including
   A. filter means connected to receive said sensor output signal or a signal dependent thereon and to pass only frequency components of the received signal above a selected frequency arising due to mechanical vibrations of parts of the apparatus; and
   B. proportional control means responsive to the signal passed by the filter means for reducing the frequency of the alternating signal applied to the motor in proportion to the frequency of said passed signal.

16. The apparatus defined in claim 15 wherein the control means include
   A. absolute value rectifying means in the converting means connected between the comparing means and the applying means; and
   B. means connected to apply said passed signal as a control signal to said rectifying means.

17. The apparatus defined in claim 15 wherein the control means include
   A. voltage regulating means in the converting means connected between the comparing means and the applying means; and
   B. means connected to apply said passed signal as a control signal to said regulating means.

* * * * *

UNITED STATES PATENT AND TRADEMARK OFFICE
CERTIFICATE OF CORRECTION

PATENT NO. : 4,527,107
DATED : Jul. 2, 1985
INVENTOR(S) : van der Pol et al.

It is certified that error appears in the above-identified patent and that said Letters Patent are hereby corrected as shown below:

On the title page
Assignee name is spelled incorrectly.

Change "Rheotron" to --Rheometron--.

Signed and Sealed this

Eighteenth Day of February 1986

[SEAL]

Attest:

Attesting Officer

DONALD J. QUIGG

Commissioner of Patents and Trademarks